United States Patent
Falconetti et al.

(10) Patent No.: US 9,094,849 B2
(45) Date of Patent: Jul. 28, 2015

(54) COMMUNICATION OF DATA USING INDEPENDENT DOWNLINK AND UPLINK CONNECTIONS

(75) Inventors: Laetitia Falconetti, Aachen (DE); Chrysostomos Koutsimanis, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 46 days.

(21) Appl. No.: 14/001,413

(22) PCT Filed: Feb. 23, 2011

(86) PCT No.: PCT/EP2011/052680
§ 371 (c)(1),
(2), (4) Date: Aug. 23, 2013

(87) PCT Pub. No.: WO2012/113449
PCT Pub. Date: Aug. 30, 2012

(65) Prior Publication Data
US 2013/0337795 A1  Dec. 19, 2013

(51) Int. Cl.
*H04M 3/00* (2006.01)
*H04W 24/02* (2009.01)
(Continued)

(52) U.S. Cl.
CPC .............. *H04W 24/02* (2013.01); *H04L 5/001* (2013.01); *H04L 5/0094* (2013.01); *H04W 72/04* (2013.01); *H04W 72/0426* (2013.01)

(58) Field of Classification Search
CPC . H04W 24/02; H04W 72/0426; H04W 72/04; H04L 5/001; H04L 5/0094
USPC .............. 455/419, 418, 452.1, 411, 434, 423; 370/329, 252, 331, 328, 332
See application file for complete search history.

(56) References Cited

U.S. PATENT DOCUMENTS

2008/0013480 A1 * 1/2008 Kapoor et al. ................ 370/328
2010/0008294 A1   1/2010 Palanki et al.
(Continued)

FOREIGN PATENT DOCUMENTS

EP    2 291 053 A1   3/2011
WO   2010034528 A1   4/2010
(Continued)

OTHER PUBLICATIONS

NTT DoCoMo et al. "Inter-cell Radio Resource Management for Heterogeneous Network" vol. 3GPP TSG RAN WG1 Meeting #54, No. R1-083019, 2008, XP008136476, 20 pages.
(Continued)

*Primary Examiner* — Khai M Nguyen
(74) *Attorney, Agent, or Firm* — Rothwell, Figg, Ernst & Manbeck, P.C.

(57) ABSTRACT

In communication of data between a first base station and a mobile terminal, a second base station may handle uplink transmissions from the mobile terminal. For this purpose, the first base station sends, to the second base station, a request to handle the uplink transmissions from the mobile terminal. Further, the first base station sends carrier information to the second base station. The carrier information indicates one or more uplink carriers for receiving the uplink transmissions. The one or more uplink carriers are controlled by the second base station. Moreover, the first base station sends downlink transmissions to the mobile terminal. The downlink transmissions include configuration data. By means of the configuration data, the mobile terminal is configured to send uplink transmissions on the one or more uplink carriers as indicated by the carrier information, e.g., on an uplink payload channel controlled by the second base station.

23 Claims, 11 Drawing Sheets

(51) Int. Cl.
   *H04L 5/00*      (2006.01)
   *H04W 72/04*      (2009.01)

(56) References Cited

U.S. PATENT DOCUMENTS

| | | | |
|---|---|---|---|
| 2010/0105404 A1 | 4/2010 | Palanki et al. | |
| 2010/0238827 A1 | 9/2010 | Borran et al. | |
| 2011/0274073 A1* | 11/2011 | Sumasu et al. | 370/329 |
| 2013/0201966 A1* | 8/2013 | Weng et al. | 370/336 |
| 2013/0301609 A1* | 11/2013 | Smith et al. | 370/331 |

FOREIGN PATENT DOCUMENTS

| | | | |
|---|---|---|---|
| WO | 2010083892 A1 | 7/2010 | |
| WO | 2010087175 A1 | 8/2010 | |

OTHER PUBLICATIONS

NTT DoCoMo et al. "Inter-cell Radio Resource Management for Heterogeneous Networks" vol. 3GPP TSG RAN WG1 Meeting #58bis, No. R1-094246, 2009, 8 pages.

Morimoto et al. "Investigation on Optimum Radio Link Connection Using Remote Radio Equipment in Heterogeneous Network for LTE-Advanced" 2009 IEEE 69th Vehicular Technology Conference, XP031474564, ISBN: 978-1-4244-2517-4, 5 pages.

Ericsson et al. "Aspects on Distributed RRUs with Shared Cell-ID for Heterogeneous Deployments" 3GPP TSG-RAN WG1 #64, R1-110649, 2011, 3rd Generation Partnership Project (3GPP), XP050490740, 11 pages.

Ericsson et al. "Considerations on non-CA based heterogeneous deployments" 3GPP TSG-RAN WG1 meeting #60 bis, R1-101752, 2010, 4 pages.

\* cited by examiner

COMMUNICATION OF DATA USING INDEPENDENT DOWNLINK AND UPLINK CONNECTIONS

CROSS REFERENCE TO RELATED APPLICATION(S)

This application is a 35 U.S.C. §371 National Phase Entry Application from PCT/EP2011/052680, filed Feb. 23, 2011, designating the United States, the disclosure of which is incorporated herein in its entirety by reference.

TECHNICAL FIELD

The present invention relates to methods for communication of data using independent downlink (DL) and uplink (UL) connections to a mobile terminal, and to corresponding devices.

BACKGROUND

In mobile communication networks, such as 3GPP networks (3GPP: Third Generation Partnership Project) there is a continuing need for higher throughputs. In UL communication, i.e., in communication from a mobile terminal to the network, transmit power limitations in mobile terminals and constraints on the UL budget mean that such higher throughputs typically necessitate smaller cell sizes than is typically deployed for present cellular systems. For example, in heterogeneous networks, also referred to as HetNet, conventional base stations (BSs), referred to as Macro BSs, are complemented by further BSs, which are usually deployed closer to the end users, e.g., on street level. As compared to the Macro BSs, these further BSs typically transmit at a lower power. In the following, these further BSs will also be referred to as Pico BSs. The Pico BSs can use carrier frequencies from the same spectrum as the Macro BSs or may use carrier frequencies from another spectrum.

In current cellular networks, e.g., 3GPP Long Term Evolution (LTE), cell association is based on a Reference Signal Received Power (RSRP) measurement by the mobile terminal. That is to say, the respective RSRPs as measured for different BSs are used as a basis for selecting a serving BS of the mobile terminal, which then sends DL transmissions to the mobile terminal and receives UL transmissions from the mobile terminal. The RSRP depends on the transmit (Tx) power of the respective BS. In the case of a heterogeneous network deployment, there may be a large imbalance in the Tx power between a Macro BS and a Pico BS. Specifically, Macro BSs usually transmit at a high Tx power level, e.g., 46 dBm, whereas Pico BSs may use a much lower Tx power level, e.g., 30 dBm, or even less. Thus, the difference in Tx power between transmitted reference signals can be 16 dB or more. The RSRP is indicative of a DL channel quality between the BS and the mobile terminal. As compared to that, the UL channel quality between the mobile terminal and the BS depends on the signal damping, also referred to as pathloss, between the mobile terminal and the BS.

In conventional homogeneous networks, the BS that provides the highest RSRP is identical to the BS that yields the lowest average pathloss. However, this is not the case in heterogeneous networks. The imbalance in the Tx power among the different types of BSs may lead to a situation where a mobile measures a higher RSRP from a Macro BS, although it is located closer to a Pico BS and its pathloss to the Pico BS is smaller than the pathloss to the Macro BS. In this case, it would be preferable for the mobile terminal to receive data from the BS with the highest RSRP, i.e., from the Macro BS, and to transmit data to the BS with the lowest pathloss, i.e., to the Pico BS.

Accordingly, in a heterogeneous network conventional RSRP-based cell association may result in suboptimal performance in the UL.

A suggested way to balance the performance between DL and UL in a heterogeneous network is to use independent DL and UL connections, i.e., to use one BS for the DL and another BS for the UL. Specifically the UL transmissions of mobile terminals located at a cell border of a Macro BS may then benefit from the improved UL channel quality to a Pico BS which is closer to the mobile terminal than the Macro BS.

Accordingly, there is a need for techniques which allow for efficiently implementing independent DL and UL connections to a mobile terminal.

SUMMARY

According to an embodiment of the invention, a method of communicating data between a first base station and a mobile terminal is provided. According to the method, the first base station sends, to a second base station, a request to handle uplink transmissions from the mobile terminal. Further, the first base station sends carrier information to the second base station. The carrier information indicates one or more uplink carriers for receiving the uplink transmissions. The one or more uplink carriers are controlled by the second base station. Moreover, the first base station sends downlink transmissions to the mobile terminal. The downlink transmissions include configuration data for configuring the mobile terminal to send uplink transmissions on the one or more uplink carriers as indicated by the carrier information.

According to a further embodiment of the invention, a method of assisting in communicating data between a first base station and a mobile terminal is provided. According to the method, a second base station receives, from the first base station, a request to handle uplink transmissions from the mobile terminal. Further, the second base station receives carrier information from the first base station. The carrier information indicates one or more uplink carriers for receiving the uplink transmissions. The one or more uplink carriers are controlled by the second base station. Moreover, the second base station receives the uplink transmissions from the mobile terminal on the one or more uplink carriers as indicated by the carrier information.

According to a further embodiment of the invention, a base station is provided. The base station comprises a radio interface to send downlink transmissions to a mobile terminal and to receive uplink transmissions from the mobile terminal. Further, the base station comprises a backhaul interface to communicate with a further base station. Moreover, the base station comprises a processor to control operations of the base station. These controlled operations comprise:
  via the backhaul interface, the base station sending to the further base station a request to handle uplink transmissions from the mobile terminal;
  via the backhaul interface, the base station sending to the further base station carrier information indicating one or more uplink carriers for receiving the uplink transmissions, the one or more uplink carriers being controlled by the further base station; and
  via the radio interface, the base station sending downlink transmissions to the mobile terminal, said downlink transmissions including configuration data for configuring the mobile terminal to send the uplink transmissions on the one or more uplink carriers as indicated by the carrier information.

According to a further embodiment of the invention, a base station is provided. The base station comprises a radio interface to send downlink transmissions to a mobile terminal and to receive uplink transmissions from the mobile terminal. Further, the base station comprises a backhaul interface to communicate with a further base station. Moreover, the base station comprises a processor to control operations of the base station. These controlled operations comprise:

via the backhaul interface, the base station receiving from the further base station a request to handle uplink transmissions from the mobile terminal;
via the backhaul interface, the base station receiving from the further base station carrier information indicating one or more uplink carriers for receiving the uplink transmissions, said one or more uplink carriers being controlled by the base station; and
via the radio interface, the base station receiving the uplink transmissions from the mobile terminal on the one or more uplink carriers as indicated by the carrier information.

According to a further embodiment of the invention, a communication system is provided. The communication system comprises a first base station and a second base station. The communication system is configured to perform operations comprising:

the first base station sending, to the second base station, a request to handle uplink transmissions from the mobile terminal;
the second base station receiving the request to handle uplink transmissions;
the first base station sending, to the second base station, carrier information indicating one or more uplink carriers for receiving the uplink transmissions, the one or more uplink carriers being controlled by the second base station;
the second base station receiving the carrier information;
the first base station sending downlink transmissions to the mobile terminal, the downlink transmissions including configuration data for configuring the mobile terminal to send the uplink transmissions on the one or more uplink carriers as indicated by the carrier information; and
the second base station receiving the uplink transmissions from the mobile terminal on the one or more uplink carriers as indicated by the carrier information.

According to further embodiments, other methods, devices, or computer program products including program code to be executed by a processor for implementing the methods may be provided.

DETAILED DESCRIPTION OF EMBODIMENTS

In the following, the invention will be explained in more detail by referring to exemplary embodiments and to the accompanying drawings. The illustrated embodiments relate to concepts for independent uplink communication from a mobile terminal. In the illustrated examples, it will be assumed that downlink and uplink communication is implemented according to 3GPP LTE. However, it is to be understood that the illustrated concepts may also be applied in other types of mobile communication networks.

Figure 1:
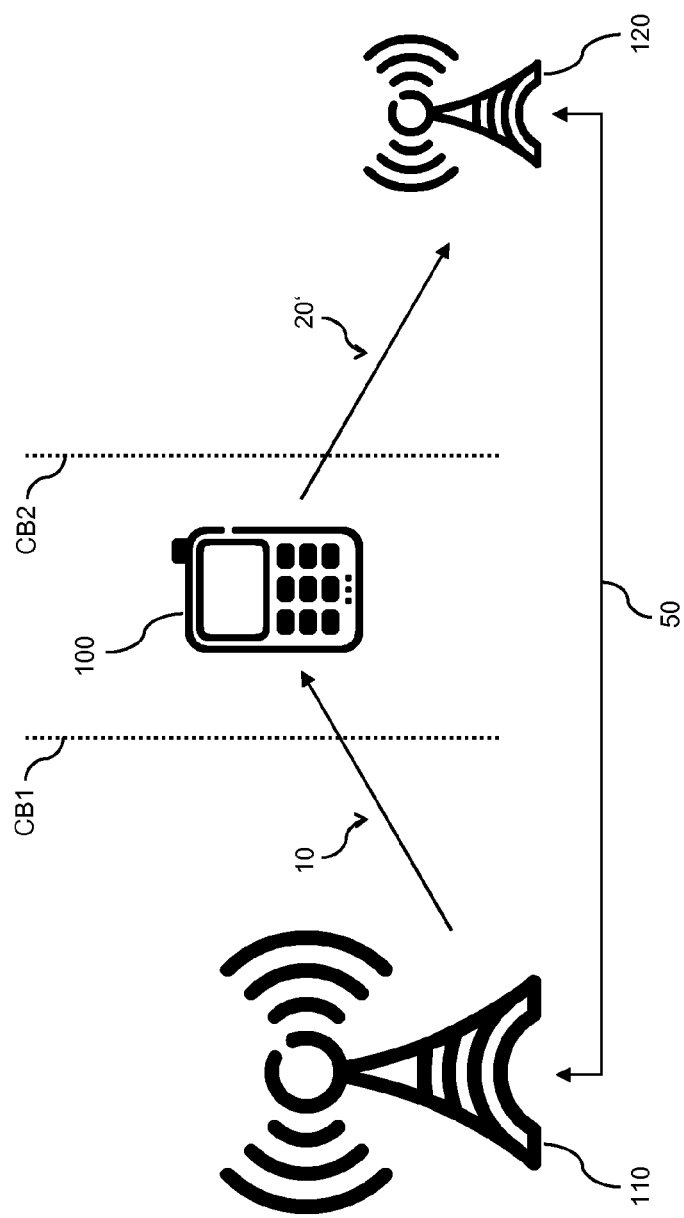
FIG. 1 schematically illustrates a mobile communication network environment in which concepts of data communication according to an embodiment of the invention can be applied.

FIG. 1 schematically illustrates a mobile communication network environment, i.e., infrastructure of a mobile communication network, represented by a first base station (BS) 110 and a second BS 120, and a mobile terminal 100 to be used in the mobile communication network. The mobile terminal 100 may be, e.g., a mobile phone, portable computer, or other type of user equipment (UE). In the following, the mobile terminal 100 will also be referred to as UE. As illustrated, the communication network supports an independent link mode using independent DL and UL connections to the UE 100. In the independent link mode the UE 100 receives DL transmissions 10 from the first BS 110 and the second BS 120 receives UL transmissions 20 from the UE 100. For implementing the independent link mode, the first BS 110 and the second BS 120 communicate via a backhaul link 50. However, the communication network also supports a conventional mode in which the UE 100 receives DL transmissions from one of the BSs 110, 120 and this BSs 110, 120 also receives the UL transmissions from the UE 100.

As further illustrated, the mobile communication network is based on a heterogeneous network deployment in which the first BS 110 corresponds to a Macro BS and the second BS 120 corresponds to a Pico BS. This means that the second BS 120 transmits at a lower Tx power than the first BS 110. In accordance with the illustrated 3GPP LTE scenario, the BSs 110, 120 may each correspond to an evolved Node B (eNB) and the DL and UL transmissions 10, 20 may be transmitted across the Uu radio interface. The backhaul link 50 may be established by directly connecting the BSs 110, 120, e.g., via the X2 interface, or by indirectly connecting the BSs 110, 120, e.g., via one or more intermediate nodes using several X2 and/or S1 interfaces. The backhaul link 50 that can be wire based, e.g., using optical fiber, twisted pair copper lines, and/or coaxial lines, or can be wireless, e.g., using microwave transmission, Wireless Local Area Network (WLAN), or LTE. In some scenarios, the backhaul link 50 may also be implemented by a combination of wire based transmission and wireless transmission, e.g., by using any combination of the above-mentioned examples of wire based and wireless technologies.

Whether the conventional mode or the independent link mode is used may be selected, e.g., on the basis of the pathloss from the UE 100 to the second BS 120. More specifically, the selection may be on the basis of the difference between the pathloss from the UE 100 to the second BS 120 and the pathloss from the UE 100 to the first BS 110. Concepts of selecting between the conventional mode and the independent link mode will now be further explained by referring to illustrative cell border lines CB1 and CB2 in FIG. 1.

The cell border line CB1 illustrates a cell border between the first and second BSs 110, 120 when assuming a selection mechanism on the basis of the pathloss. In this pathloss-based selection mechanism, the BS having the lowest pathloss would be selected for handling communications with the UE 100. The pathloss-based selection mechanism is favorable in view of UL performance. The cell border line CB2 illustrates a cell border between the first and second BSs 110, 120 when assuming a selection mechanism on the basis of received signal quality at the UE 100, e.g., on the basis of the RSRP. In this received-signal quality based selection mechanism, the BS offering the highest received signal quality at the UE would be selected for communicating with the UE 100. The received-signal quality based selection mechanism is favorable in view of DL performance.

In the illustrative scenario of FIG. 1, the UE 100 is located in a transition area between the cell border lines CB1 and CB2. This means that, the pathloss-based selection mechanism, which is favorable in view of UL performance, would select the second BS 120, whereas the received-signal quality based selection mechanism, which is favorable in view of DL performance, would select the first BS 110. In this situation, overall performance can be improved by selecting the independent link mode.

The pathloss PL from a UE to a BS may be estimated by the difference between the RSRP at the UE and the Tx power at the BS. In this case, it can be seen that the UE 100 being in the transition area between the first BS 110 and the second BS 120 means that the RSRP of the first BS 110, denoted by RSRP1, the RSRP of the second BS 120, denoted by RSRP2, the Tx power of the first BS 110, denoted by PTx1, and the Tx power of the second BS 120, denoted by PTx2, satisfy the relation:

$$RSRP1-RSRP2 \le PTx1-PTx2. \quad (1)$$

Relation (1) may therefore be used to identify whether a particular UE is located in the transition area between two BSs. The needed RSRPs can be obtained from measurement reports. The Tx powers can be obtained, e.g., from Operations and Maintenance data or by using exchanging messages with neighboring BSs.

According to embodiments of the invention as further explained in the following, implementation of the independent DL and UL connections in the independent link mode utilizes a carrier aggregation capability of the UE 100. In this respect "carrier aggregation" refers to the simultaneous use of multiple carriers, also referred to as component carriers or as primary and secondary cells, for receiving DL data and transmitting UL data. In carrier aggregation, each of the aggregated carriers uses individual processes of coding, modulation, demodulation, and decoding. In some scenarios, multicarrier modulation and coding schemes, e.g., using Orthogonal Frequency Division Multiplexing (OFDM), may be used for DL or UL transmissions on each carrier, i.e., each carrier may include a number of subcarriers. For example, the carrier aggregation may be implemented according to the specifications of LTE Advanced (LTE Release 10 or later). By using carrier aggregation, the UE has access to higher bandwidth and can achieve higher bit rates. The aggregated carriers forming a DL or UL connection to the UE 100 can be from different spectra.

Figure 2:
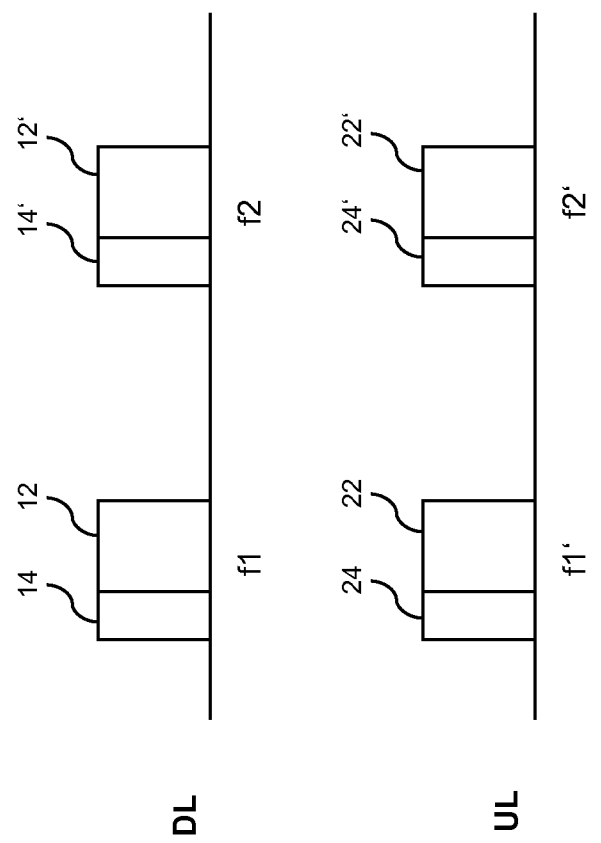
FIG. 2 schematically illustrates concepts of carrier aggregation as used in an embodiment of the invention.

The concepts of carrier aggregation as used herein are schematically illustrated in FIG. 2. In FIG. 2 it is assumed that to each of the first BS 110 and second BS 120 respective UL and DL carriers are assigned. Typically, these UL and DL carriers will be located at different frequencies. More specifically, FIG. 2 illustrates a first DL carrier f1 of the first BS 110, a first UL carrier f1' of the first BS 110, a second DL carrier f2 of the second BS 120, and a second UL carrier f2' of the second BS 120. The first DL carrier f1 includes a first DL payload channel 12 to the UE 100 and a first DL control channel 14 to the UE 100. In accordance with the illustrated LTE scenario, the first DL payload channel 12 may be a Physical Downlink Shared Channel (PDSCH), and the first DL control channel 14 may be a Physical Downlink Shared Channel (PDCCH). The first UL carrier f1' includes a first UL payload channel 22 from the UE 100 and a first UL control channel 24 from the UE 100. In accordance with the illustrated LTE scenario, the first UL payload channel 22 may be a PUSCH, and the first UL control channel 24 may be a PUCCH. The second DL carrier f2 includes a second DL payload channel 12' to the UE 100 and a second DL control channel 14' to the UE 100. In accordance with the illustrated LTE scenario, the second DL payload channel 12' may be a PDSCH, and the second DL control channel 14' may be a PDCCH. The second UL carrier f2' includes a second UL payload channel 22' from the UE 100 and a second UL control channel 24' from the UE 100. In accordance with the illustrated LTE scenario, the second UL payload channel 22' may be a PUSCH, and the second UL control channel 24' may be a PUCCH.

In the above-mentioned conventional mode, the first BS 110 may utilize carrier aggregation to not only use its own carriers, i.e., the first DL carrier f1 and/or the first UL carrier f1' for communication with the UE 100, but also the carriers assigned to the second BS 120, i.e., the second DL carrier f2 and/or the second UL carrier f2'. This may help to increase performance of the first BS 110 when resources of the second BS 120 are unused. In a similar way, the second BS 120 may utilize carrier aggregation to not only use its own carriers, i.e., the second DL carrier f2 and/or the second UL carrier f2' for communication with the UE 100, but also the carriers assigned to the first BS 120, i.e., the first DL carrier f1 and/or the first UL carrier f2'. When using carrier aggregation in the conventional mode, the one BS may thus make use of one or more additional carriers, e.g., from another BS, and the UE is connected to the same BS for both DL and UL.

In the independent link mode, the carrier aggregation capabilities of the UE 100 are utilized for implementing the independent DL and UL connections to the UE 100. More specifically, the first BS 110 may use the first DL carrier f1 for sending DL transmissions to the UE 100, whereas the second BS 120 may simultaneously use the second UL carrier f2' for receiving UL transmissions from the UE 100 while controlling the second UL carrier f2'. Said control of the second UL carrier f2' by the second BS 120 means that the second BS 120 performs scheduling of the UL transmissions on the second UL carrier f2' which typically comprises allocation of time/frequency resources and/or Tx power adjustment. From the perspective of the UE 100, this configuration may be implemented in a transparent manner, i.e., there is no difference in the operation of the UE 100 as compared to the above situation of using carrier aggregation in the conventional mode. More specifically, the UE 100 does not need to know that the UL transmissions are received and controlled by the second BS 120, and not by the first BS 110. Further details of exemplary implementations will be explained below.

It is to be understood that the above concepts can be generalized to an arbitrary number of BSs and carriers assigned to each BS. That is to say, the first and second BSs 110, 120 of the above example could be any two BSs from a plurality of BSs, and to each of the BSs there could be assigned one or more carriers for the DL and one or more carriers for the UL.

Figure 3:
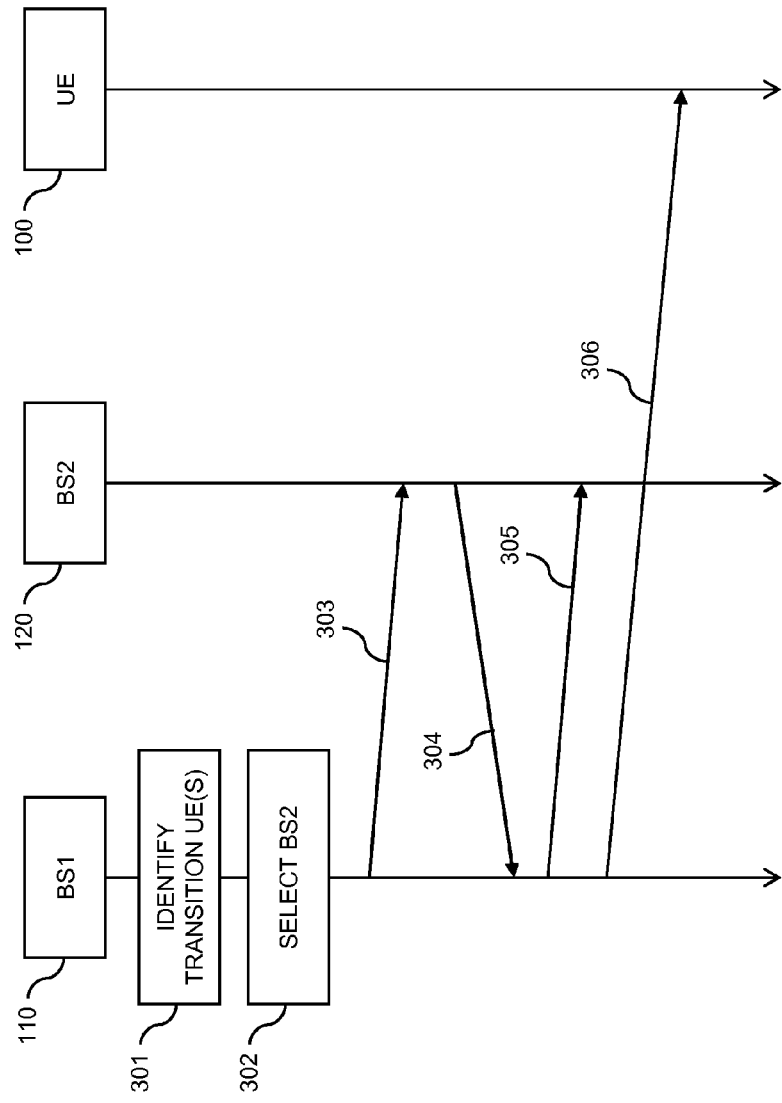
FIG. 3 shows a signaling diagram of a process for establishing independent DL and UL connections according to an embodiment of the invention.

FIG. 3 shows a signaling diagram for schematically illustrating a process for establishing the independent DL and UL connections to the UE. More specifically, FIG. 3 illustrates communication between the first BS 110, the second BS 120, and the UE 100. In the process of FIG. 3, it is assumed that the first BS 110 is the serving BS 110 of one or more UEs, i.e., controls communications with respect to these UEs. This selection may be based on a conventional selection mechanism, e.g., on the basis of a received signal quality at the UE such as represented by the RSRP.

At step 301, the first BS 110 identifies one or more transition UEs among the UEs served by the first BS 110. As explained above, the transition UEs are UEs for which the first BS 110 offers the highest received signal quality at the UE, but another BS provides a lower pathloss than the first BS 110. The transition UEs may be identified using relation (1). Further, the transition UEs may be identified by comparing results of a received-signal quality based selection mechanism, e.g., on the basis of the RSRP, to results of a pathloss-based selection mechanism. Accordingly, both types of selection may be applied, and if for a certain UE the received-signal quality based selection mechanism indicates that the first BS 110 should be selected, whereas the pathloss-based selection mechanism indicates that another BS should be selected, this UE may be identified as a transition UE. Here, it should be noted that if for a certain UE the received-signal quality based selection mechanism indicates that another BS than the first BS 110 should be selected, this UE may be identified as a candidate for a handover to the other BS. In some scenarios, also a transition UE may be identified as a candidate for a handover, e.g., if for a certain UE the received-signal quality based selection mechanism indicates that another BS than the first BS 110 should be selected, but this other BS is different from a BS indicated by the pathloss-based selection mechanism. For example, the pathloss-based selection mechanism may indicate a still further BS or may indicate the first BS 110.

Having identified at least one transition UE, e.g., the UE 100 as illustrated in FIG. 1, a BS for handling UL transmissions from the transition UE is selected at step 302. In the illustrated example, the second BS 120 is selected. The selection may be based on the pathloss. More specifically, the second BS 120 may be selected on the basis of the difference between the pathloss from the transition UE to the first BS 110 and the pathloss from the transition UE to the second BS 120. For example, the second BS 120 may be selected if it provides a lower pathloss from the transition UE than the first BS 110. If there are multiple BSs providing a lower pathloss from the transition UE than the first BS 110, the second BS 120 may be selected among these multiple BSs as the one providing the lowest pathloss from the transition UE. Further, in view of relation (1), the second BS 120 may also be selected on the basis of a difference between the Tx power of the first BS 110 and the Tx power of the second BS 120.

It should be noted that the selections of steps 301 and 302 may be combined using a single selection mechanism. For example, the pathloss-based selection mechanism of step 301 may be used to identify one or more transition UEs, and at the same time the BS for handling UL transmissions from the respective transition UE. In particular, the other BS as indicated by the pathloss-based selection mechanism may also be selected as the BS for handling UL transmissions from the respective transition UE.

The first BS 110 then sends a message 303 to the second BS 120. The message 303 includes a request to handle UL transmissions from one or more of the UEs which were identified as being in the transition area between the first BS 110 and the second BS 120. The request may include or be accompanied by additional information, e.g., information for identifying the UE or UEs to which the request pertains, information on reference signals used by the UE or UEs to which the request pertains, UL scheduling information of the UE or UEs to which the request pertains, information on characteristics of the UE or UEs to which the request pertains, and/or information on an expected load associated with requested handling of the UL transmissions. Using the received information, the second BS 120 may perform measurements on the UL transmissions from the identified UEs. For example, the second BS 120 may determine a timing advance offset needed to synchronize the UL transmissions from the identified UE or UEs with other UL transmissions from UEs already handled by the second BS 120.

The second BS 120 may reject the request, e.g., if capacity available at the second BS 120 is not sufficient for the requested handling of UL transmissions. Otherwise, the second BS 120 may accept the request. The second BS 120 may indicate the rejection or acceptance of the request by sending a message 304 to the first BS 110. The message 304 may include carrier availability information indicating one or more UL and/or DL carriers controlled by the second BS 120, which could be used for the requested handling of the UL transmissions. In some scenarios, such carrier availability information may already be known to the first BS 110, and transmission of the carrier availability information between the first and second BS 110, 120 is not needed. The message 304 may also include information on the cell load or on the amount of resources that the second BS 120 is willing to provide for handling the UL transmissions. Further, the message 304 may also include information about a timing advance offset needed to synchronize the UL transmissions of a UE to which the request of message 303 pertains with UL transmissions of other UEs already handled by the second BS 120.

If the message 304 indicates acceptance of the request, the first BS 110 may send a further message 305 to the second BS 120. The message 305 may confirm the setup of independent DL and UL connections and/or may include information to be used by the second BS 120 in handling the UL transmissions. In particular, the message 305 may include carrier information indicating one or more UL carriers for receiving the UL transmissions at the second BS 120 and/or one or more DL carriers for sending DL transmissions from the second BS 120 to the UE. The first BS 110 may select these carriers for receiving the UL transmissions or sending the DL transmissions from the carriers indicated in the received carrier availability information. Further, the message 305 may also include UE specific information to be used by the second BS 120 in handling the UL transmissions. For example, this UE specific information may include a reference signal (RS) of the UE or UEs from which UL transmissions are to be handled, e.g., demodulation RS and/or sounding RS, and/or a UE specific scrambling sequence of the UE or UEs from which UL transmissions are to be handled. In modifications of the above process, the carrier information and/or the UE specific information may also be included in the message 303. Further, the message 305 may also include information which is specific to the first BS 110, e.g., a specific DL RS which may be used by the second BS 120 in DL transmissions to the UE 100, so that these DL transmissions are seen by the UE 100 as coming from the first BS 110.

Further, if the message 304 indicates acceptance of the request, the first BS 110 may send a DL transmission 306 to the UE 100. The DL transmission 306 includes configuration data for configuring the UE 100 to send UL transmissions on the one or more UL carriers as indicated by the carrier information. The configuration data effectively control a carrier aggregation constellation to be used by the UE 100. If the UE 100 corresponds to an LTE Advanced terminal, the carrier aggregation constellation may define one of the DL carriers controlled by the first BS 110, e.g., the first DL carrier f1 of FIG. 2, and one of the UL carriers controlled by the first BS 110, e.g., the first UL carrier f1' of FIG. 2, as primary cell, whereas all other carriers are defined as secondary cells. In particular, the UL carriers controlled by the second BS 120, e.g., the second UL carrier f2' of FIG. 2, may be defined as secondary cells.

In an embodiment, the second BS 120 measures on UL transmissions from a UE to which the request of message 303 pertains the timing advance offset needed for the UL transmissions from this UE to be synchronized with UL transmissions from other UEs already handled by the second BS 120. In message 304, the second BS 120 may then include this measured timing advance offset. On the basis of the received timing advance offset, the first BS 110 may decide to cancel the procedure by not sending the conformation message 305, e.g., because the received timing advance offset does not comply with its own timing advance offset.

In the above process, the received-signal quality based selection mechanism may be the basis of first selecting the serving BS. In particular, each UE may be associated with its serving BS using conventional RSRP-based cell association. Among its served UEs, each serving BS may then identify those which are in the transition area to another BS and set up the independent UL connection to the other BS. In this way, the use of independent DL and UL connections can be kept transparent to the UEs.

Using the process of FIG. 3, the first and second BSs 110, 120 may agree on controlling specific carriers for the transition UE 100. For example, when assuming the carrier constellation of FIG. 2, the first and second BSs 110, 120 may agree that the first DL and UL carriers f1 and f1' are controlled by the first BS 110, whereas the second DL and UL carriers f2 and f2' are controlled by the second BS 120. The UE 100 does not need to be aware that two different BSs control the carriers defined in the carrier aggregation constellation. Irrespective of two BSs 110, 120 controlling the different carriers used by the UE 100, the first BS 110 still acts as the serving BS for the UE 100. In particular, in addition to scheduling the DL transmissions to the UE 100, the first BS 110 may also accomplish higher-level control processes, such as controlling the selection of the independent link mode or the conventional mode, or control of the carrier aggregation constellation to be used by the UE 100. In this respect, it should be noted that the process of controlling a carrier aggregation constellation to be used for the transition UE 100 is different from the scheduling of DL and UL transmissions for the transition UE 100. In carrier aggregation, control of a DL or UL carrier by a certain BS is defined. This DL or UL carrier may be used by the BS for communication with one or more UE. As compared to that, scheduling refers to control processes accomplished by a BS with respect to a carrier it controls, e.g., allocation of time/frequency resources among different UEs.

Figure 4:
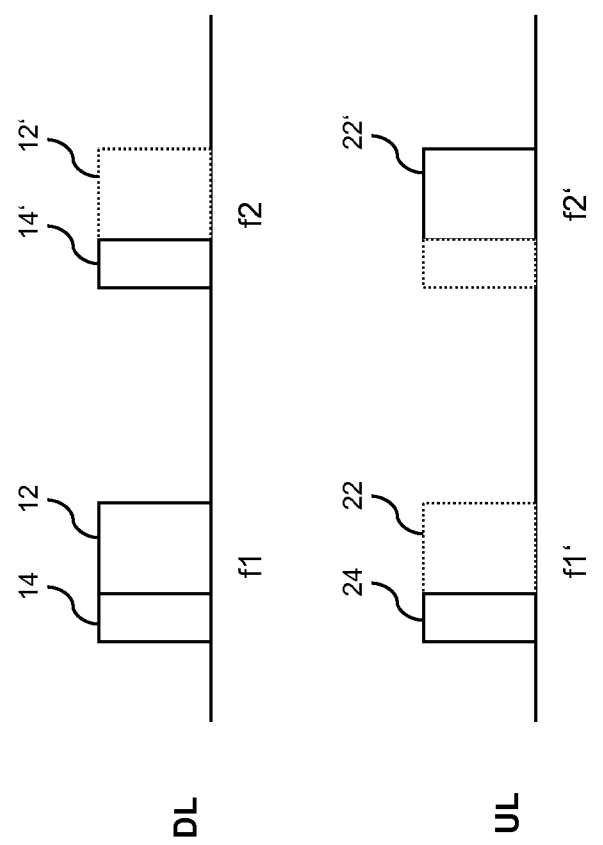
FIG. 4 schematically illustrates a carrier aggregation constellation as used in an embodiment of the invention for implementing independent DL and UL connections.

FIG. 4 schematically illustrates an example of a carrier aggregation constellation which may be used for implementing the independent DL and UL connections to the UE. The carrier aggregation constellation of FIG. 4 is based on the above constellation of FIG. 2.

Figure 5:
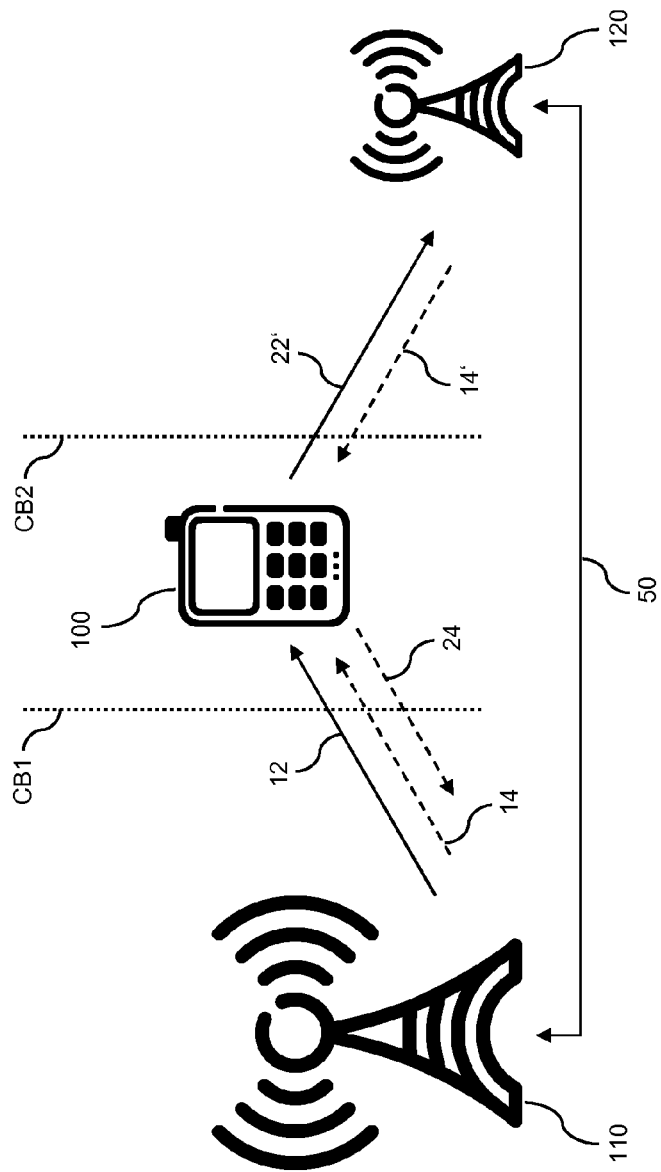
FIG. 5 schematically illustrates an implementation of independent DL and UL connections using the carrier aggregation constellation of FIG. 4.

As can be seen, the carrier aggregation constellation of FIG. 4 defines that in the DL the first DL payload channel 12, the first DL control channel 14, and the second DL control channel 14' are used. As indicated by dotted lines, the second DL payload channel 12' is not used for this UE, but may be used for another UE. In the UL, the first UL control channel 24 and the second UL payload channel 22' are used. As indicated by dotted lines, the first UL payload channel 22 and the second UL control channel 24' are not used for this UE, but may be used for another UE. The diagram of FIG. 5 illustrates the resulting configuration of independent DL and UL connections. In FIG. 5, elements which correspond to those of FIGS. 1 to 3 have been designated by the same reference signs, and reference is made also to the corresponding description in connection with FIGS. 1 to 3.

As illustrated in FIG. 5, the first base station 110 sends DL transmissions to the UE 100. The DL transmissions 10 include DL payload data transmitted on the first DL payload channel 12 and DL control data transmitted on the first DL control channel 14. The DL control data sent by the first BS 110 on the first DL control channel 14 may include a timing advance offset to be used for the UL transmissions on the first UL payload channel 24. Further, the second base station 120 receives UL transmissions from the UE 100. The UL transmissions include UL payload data transmitted on the second UL payload channel 22'. Further, the first BS 110 also receives further UL transmissions from the UE 100, namely control data transmitted on the first UL control channel 24. Moreover, the second BS 120 also sends further DL transmissions to the UE 100, namely control data transmitted on the second DL control channel 14'. As can be seen, the first BS 110 does not receive any UL payload data whereas the second BS 120 does not send any DL payload data. Corresponding resources can be used for communication with respect to other UEs.

In the configuration of FIG. 5, the UL control data received by the first BS 110 on the first UL control channel 24 may pertain to its DL transmissions on the first DL payload channel 12 and include, e.g., measurement reports generated by the UE 100. Such measurement reports may be in the form of a Precoding Matrix Indicator (PMI), a Channel Quality Indicator (CQI), a RSRP, a Received Signal Strength Indicator (RSSI), a Rank Indicator (RI), Channel State Information (CSI), and/or a mobility report. Further, the control data received by the first BS 110 on the first UL control channel 24 may include messages for acknowledging receipt of a DL transmission on the first DL payload channel 12, e.g., as represented by a positive acknowledgement (ACK) message or negative acknowledgement (NACK) message of the Hybrid Automatic Repeat Request (HARQ) protocol. The DL control data sent by the second BS 120 on the second DL control channel 14' may pertain to the UL transmissions on the second UL payload channel 22' and include, e.g., messages for acknowledging receipt of a UL transmission on the second UL payload channel 22', e.g., as represented by an ACK message or NACK message of the HARQ protocol. Further, DL control data sent by the second BS 120 on the second DL control channel 14' may include UL scheduling information, e.g., a time/frequency resource allocation and/or Tx power adjustment to be used for the UL transmissions on the second UL payload channel 22', and/or a timing advance offset to be used for the UL transmissions on the second UL payload channel 22'.

As can be seen, the configuration of FIG. 5 allows for implementing the independent DL and UL connections in a very efficient manner, which avoids excessive load on the backhaul link 50 between the first BS 110 and the second BS 120. However, it is to be understood that in some scenarios there may be some ongoing exchange of information between the first BS 110 and the second BS 120 via the backhaul link 50, e.g., concerning the timing advance offset to be used for the UL transmissions on the UL payload channel 22' and/or on first UL control channel 24. In some scenarios, e.g., if the UE 100 allows for using multiple timing advance offsets, the latter type of message exchange is not needed.

Figure 6:
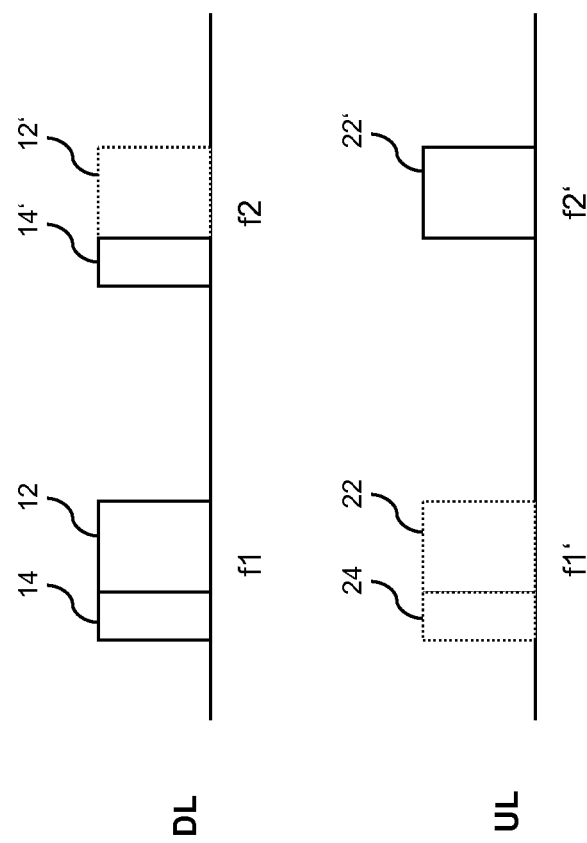
FIG. 6 schematically illustrates a carrier aggregation constellation as used in an embodiment of the invention for implementing independent DL and UL connections.

FIG. 6 schematically illustrates a further example of a carrier aggregation constellation which may be used for implementing the independent DL and UL connections to the UE. The carrier aggregation constellation of FIG. 6 is based on the above constellation of FIG. 2.

Figure 7:
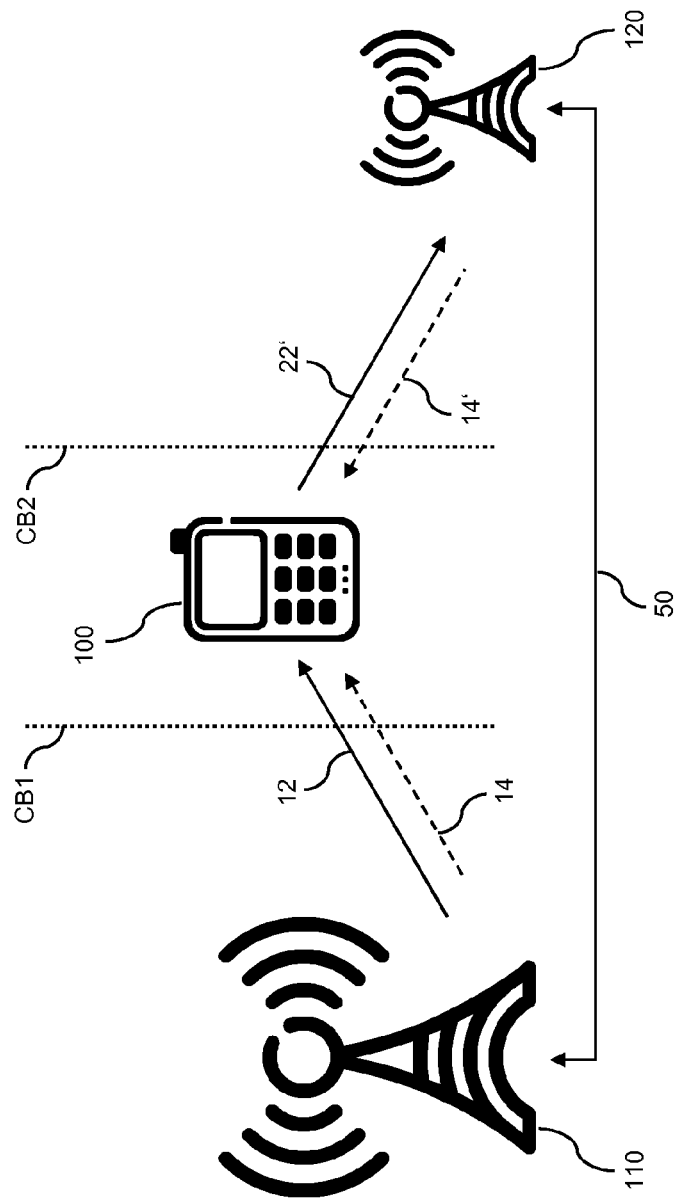
FIG. 7 schematically illustrates an implementation of independent DL and UL connections using the carrier aggregation constellation of FIG. 6.

As can be seen, the carrier aggregation constellation of FIG. 6 defines that in the DL the first DL payload channel 12, the first DL control channel 14, and the second DL control channel 14' are used. As indicated by dotted lines, the second DL payload channel 12' is not used for this UE, but may be used for another UE. In the UL, the second UL payload channel 22' is used. As indicated by dotted lines, the first UL payload channel 22, and the first UL control channel 24', and the second UL control channel 24' are not used for this UE, but may be used for another UE. The constellation of FIG. 6 may apply if no UL control channel is configured and/or if measurement reports are scheduled to transmitted on the UL payload channel, e.g., via PUSCH such as a PUSCH based CQI report. The diagram of FIG. 7 illustrates the resulting configuration of independent DL and UL connections. In FIG. 7, elements which correspond to those of FIGS. 1 to 3 have been designated by the same reference signs, and reference is made also to the corresponding description in connection with FIGS. 1 to 3.

As illustrated in FIG. 7, the first base station 110 sends DL transmissions to the UE 100. The DL transmissions include DL payload data transmitted on the first DL payload channel 12 and DL control data transmitted on the first DL control channel 14. Further, the second base station 120 receives UL transmissions from the UE 100. The UL transmissions include UL payload data transmitted on the second UL payload channel 22' and also UL control data mapped to the second UL payload channel 22'. Moreover, the second BS 120 also sends further DL transmissions to the UE 100, namely control data transmitted on the second DL control channel 14'. As can be seen, the first BS 110 does not receive any UL payload data or UL control data whereas the second BS 120 does not send any DL payload data. Corresponding resources can be used for communication with respect to other UEs.

Accordingly, in the scenario of FIG. 7 it is the second BS 120 which receives not only the UL payload data but also the UL control data. Using the backhaul link 50, the second BS 120 may then forward at least a part of the UL control data received on the second UL payload channel 22' and optionally also the UL payload data received on the second UL payload channel 22' to the first BS 110. In particular, the second BS 120 may forward UL control data which are used by the first BS 110 for controlling the DL transmissions to the UE 100. The control data transmitted from the second BS 120 to the first BS 110 may include measurement reports generated by the UE 100, e.g., as represented by a PMI, a CQI, a RSRP, a RSSI, an RI, CSI, and/or a mobility report. Further, control data transmitted from the second BS 120 to the first BS 110 may include messages for acknowledging receipt of a DL transmission on the first DL payload channel 12, e.g., as represented by an ACK message or NACK message of the HARQ protocol. Here, it is to be noted that such an acknowledgement message for a DL transmission on the first DL payload channel 12 would be generated by the UE 100, transmitted to the second BS 120 on the second UL payload channel 22', and then forwarded from the second BS 120 to the first BS 110 via the backhaul link 50. The DL control data sent by the second BS 120 on the second DL control channel 14' may pertain to the UL transmissions on the second UL payload channel 22' and include, e.g., messages for acknowledging receipt of a UL transmission on the second UL payload channel 22', e.g., as represented by an ACK message or NACK message of the HARQ protocol. Further, DL control data sent by the second BS 120 on the second DL control channel 14' may include UL scheduling information, e.g., a time/frequency resource allocation and/or Tx power adjustment to be used for the UL transmissions on the second UL payload channel 22', and/or a timing advance offset to be used for the UL transmissions on the second UL payload channel 22'.

As can be seen, the configuration of FIG. 7 allows for implementing the independent DL and UL connections in a very efficient manner, which avoids excessive load on the backhaul link 50 between the first BS 110 and the second BS 120.

Figure 8:
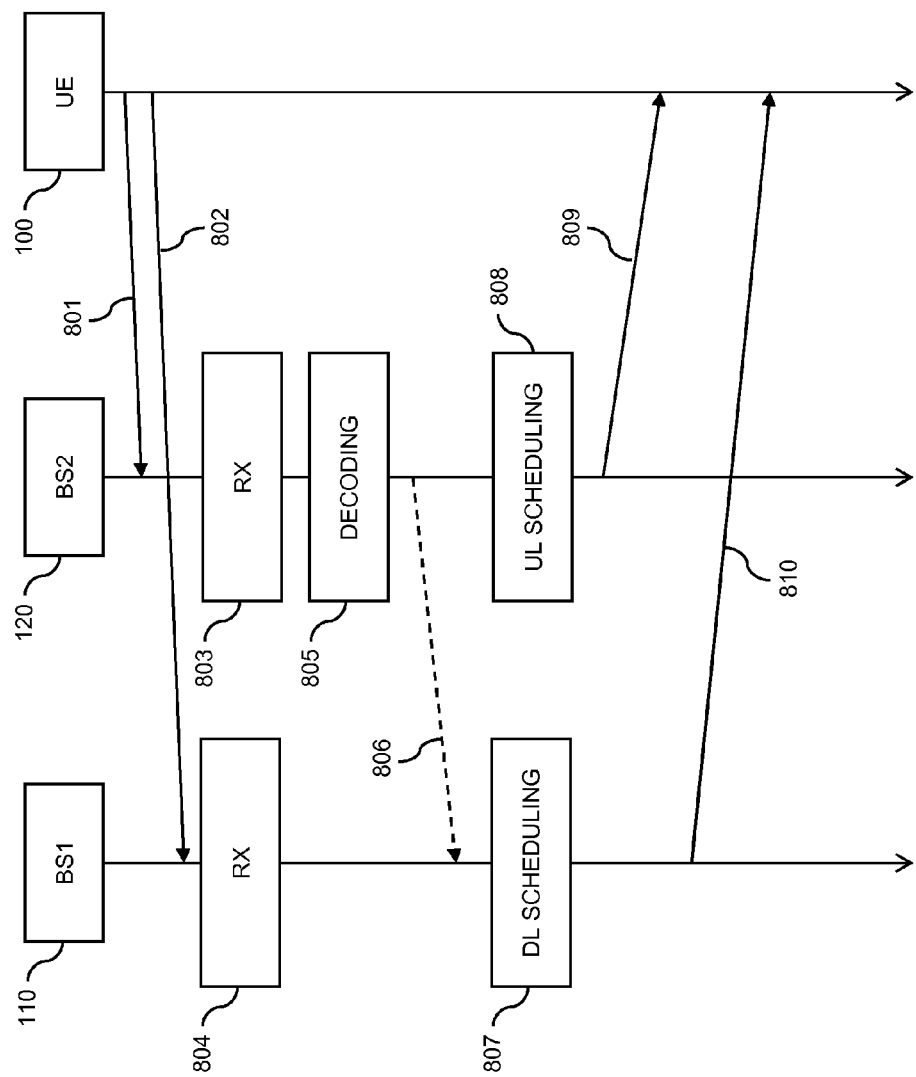
FIG. 8 shows a signaling diagram of a communication process while using independent DL and UL connections according to an embodiment of the invention.

FIG. 8 shows a signaling diagram of a communication process while using independent DL and UL connections, e.g., independent DL and UL connections as established using the process of FIG. 3 and implemented as explained in connection with FIGS. 4 and 5 or as explained in connection with FIGS. 6 and 7.

In the illustrated process, the second BS 120 handles UL transmissions from the UE 100. As illustrated, the second BS 120 receives a UL transmission 801 from the UE 100. The UL transmission 801 may be on the second UL payload channel 22' as illustrated in FIGS. 4 to 7.

Further, in the scenario of FIGS. 4 and 5, the first BS 110 may receive a further UL transmission 802 from the UE 100, which may be on the first UL control channel 14. Reception (Rx) processing of the UL transmissions 801 and 802 is illustrated at steps 803 and 804, respectively. The Rx processing may include, e.g., demodulation and conversion to digital samples.

At step 805, the second BS 120 performs decoding of the received UL transmission 801. The decoding process may also include verifying integrity of reception, e.g., by performing a cyclic redundancy check (CRC). The decoding process may be based on a UE specific scrambling sequence used by the UE 100.

The second BS 120 may then transmit a message 806 to the first BS 110. The message 806 may also include decoded payload data. By sending the decoded payload data to the first BS 110, the first BS 110 may be the BS to supply the UL payload data to the network, which means that also from the network perspective the first BS 110 appears as the serving BS for the UE 100. In the scenario of FIGS. 6 and 7, the message 806 may also include control data received with the UL transmission from the UE 100. More specifically, the control data may include acknowledgement messages for DL transmissions generated by the UE 100 and/or measurement reports generated by the UE 100. The first BS 110 may use the received control data for controlling DL transmissions to the UE 100, e.g., for performing scheduling of DL transmissions at DL scheduling step 807. In particular, the DL scheduling of step 807 may be based on measurement reports and/or acknowledgement messages received with the control data forwarded from the second BS 120. The DL scheduling of step 807 typically includes determining a time/frequency resource allocation and/or Tx power adjustment to be used for DL transmissions of payload data on the first DL payload channel 12.

At step 808, the second BS 120 performs scheduling of UL transmissions so as to obtain UL scheduling information. The UL scheduling information may in particular include allocation of time/frequency resources and Tx power adjustment for one or more future UL transmission by the UE 100. The scheduling of UL transmissions is based on channel quality measurements on the UL connection from the UE 100 to the second BS 120. Since the second BS 120 itself monitors the UL transmissions from the UE 100, the channel quality measurements can be efficiently and precisely performed by the second BS 120 and be used directly as input parameters of the scheduling process. With a DL transmission 809, the second BS 120 sends the UL scheduling to the UE 100, which may be accomplished on the second DL control channel 14'.

As further illustrated by DL transmission 810, the first BS 110 sends DL transmissions to the UE 100. For example, the DL transmission 810 may include DL payload data and be transmitted on the first DL payload channel or may include DL control data and be transmitted on the first DL control channel 14.

It is to be understood that the UL transmissions 801 and 802 may occur in a different order. For example, the UL transmission 802 and could occur before the UL transmission 801 or at a later stage of the process, e.g., after UL scheduling at step 808.

Figure 9:
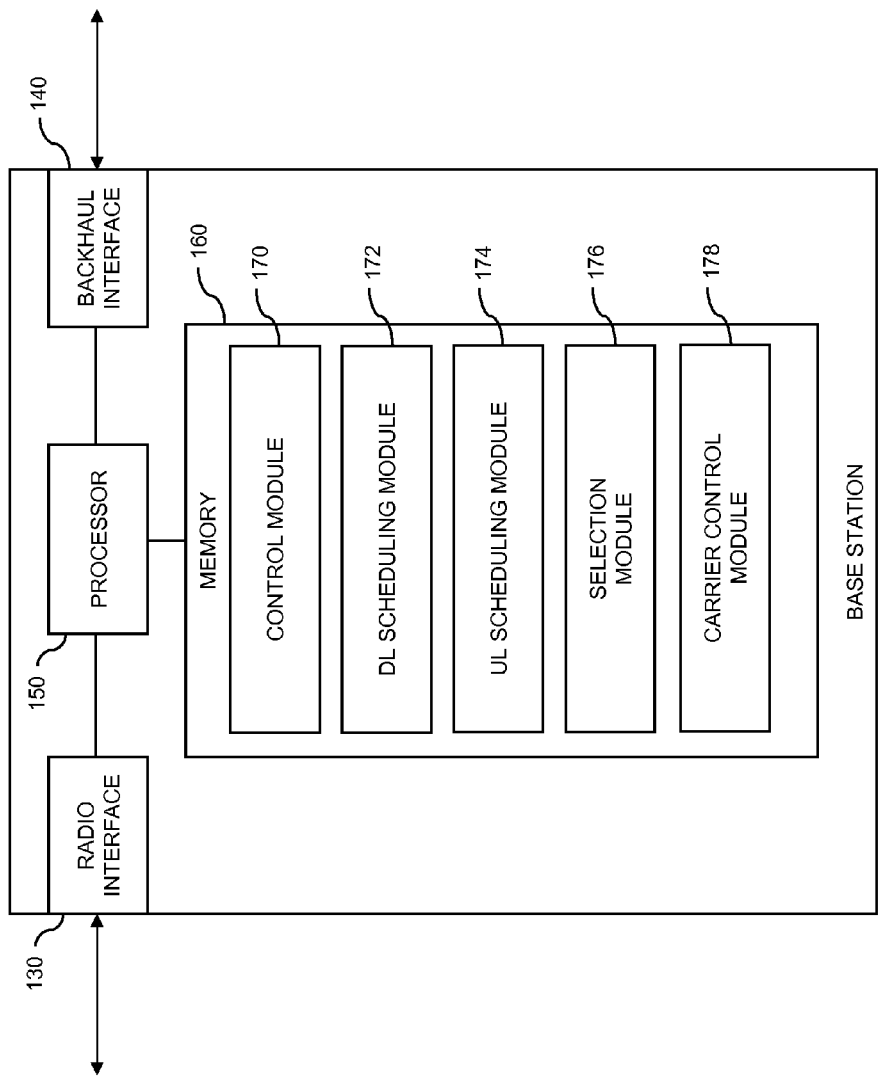
FIG. 9 schematically illustrates a base station according to an embodiment of the invention.

FIG. 9 schematically illustrates exemplary structures for implementing the above-described concepts in a BS, e.g., in the first BS 110 of FIGS. 1, 3, 5, 7, and 8 or in the second BS 120 of FIGS. 1, 3, 5, 7, and 8.

In the illustrated structure, the BS includes a radio interface 130 for transmitting DL transmissions and/or for receiving UL transmissions. It is to be understood that for implementing transmit functionalities the interface 130 will include one or more transmitters, and that for implementing receive functionalities the interface 130 will include one or more receivers. The interface 130 may correspond to the Uu radio interface according to 3GPP LTE. The interface 130 is capable of receiving and decoding UL transmissions not only from UEs served by the BS, but also from UEs served by another BS. Further, the BS includes a backhaul interface 140 for communicating with one or more other BSs, e.g., for implementing the backhaul link 50 as illustrated in FIGS. 1, 3, 5, and 7.

Further, the BS includes a processor 150 coupled to the interface 130 and a memory 160 coupled to the processor 150. The memory 160 may include a read-only memory (ROM), e.g. a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the BS. More specifically, the memory 160 may include control module 170 for controlling communication with respect to one or more UE, e.g., the UE 100 of FIGS. 1, 3, 5, and 7. The control module 170 may further be configured to control generating, sending and receiving of messages as described in connection with FIGS. 3 and 8. Moreover, the control module 170 may also be configured to control channel quality measurements performed by the BS, in particular channel quality measurements on UL connections from UEs which are not served by the BS. Further, the memory 160 may include a DL scheduling module 172 for scheduling DL transmissions of a UE and/or an UL scheduling module 174 for scheduling UL transmissions of a UE as explained in connection with FIGS. 5, 7, and 8. In particular, the UL scheduling module 174 may be configured to accomplish UL scheduling not only for UEs served by the BS, but also for UEs served by another BS, when handling UL transmissions from the UEs served by the other BS. Further, the memory 160 may also include a selection module 176 for identifying transition UEs and/or selecting other BSs for handling UL transmissions of a UE served by the BS, e.g., as explained in connection with FIGS. 1 and 3. Further, the memory 160 may include a carrier control module 178 for accomplishing the above processes of defining carrier aggregation constellations and providing corresponding information to a UE and/or to another BS.

It is to be understood that the structure as illustrated in FIG. 9 is merely schematic and that the BS may actually include further components which, for the sake of clarity, have not been illustrated, e.g., further interfaces. Also, it is to be understood that the memory 160 may include further types of program code modules, which have not been illustrated. For example, the memory 160 may include program code modules for implementing typical functionalities of a BS. According to some embodiments, also a computer program product may be provided for implementing concepts according to embodiments of the invention, e.g., a computer-readable medium storing the program code and/or other data to be stored in the memory 160.

Figure 10:
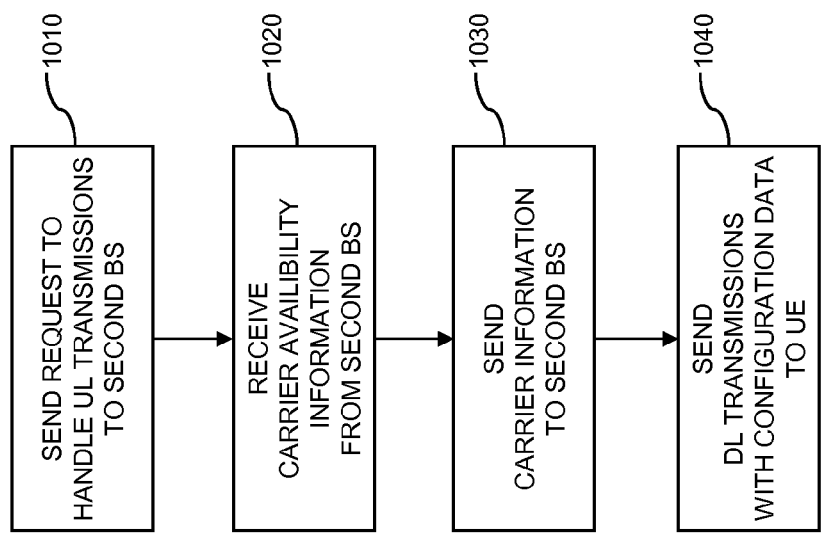
FIG. 10 shows a flowchart for illustrating a method according to an embodiment of the invention.

FIG. 10 shows a flowchart for schematically illustrating a method according to an embodiment of the invention. The method may be used in the first BS 110 of FIGS. 1, 3, 5, 7, and 8 for implementing the above-described processes using independent DL and UL connections.

At step 1010, a first BS sends a request to a second BS. By means of the request, the second BS is requested to handle UL transmissions from a UE. The first BS may be the serving BS of the UE, i.e., may control communications with respect to the UE. The first BS may be the first BS 110 of FIGS. 1, 3, 5, 7, and 8, the second BS may be the second BS 120 of FIGS. 1, 3, 5, 7, and 8, and the UE may be the UE 100 of FIGS. 1, 3, 5, 7, and 8. The request to handle UL communications from the UE may be sent via a backhaul link, e.g., the backhaul link 50 of FIGS. 1, 5, and 7. The backhaul link may be established across respective backhaul interfaces of the first and second BSs, such as the backhaul interface 140 of FIG. 9. The requested handling of UL transmissions may include scheduling of the UL transmissions so as to obtain UL scheduling information, such as a time/frequency resource allocation and/or Tx power adjustment used for the UL transmissions. In addition, the requested handling of the UL transmissions typically also includes reception and decoding of the UL transmissions. Before sending the request, the first BS may select the second BS from a plurality of BSs, e.g., using selection mechanisms as described in connection with FIGS. 1 and 3.

Optionally, the first BS may receive a message indicating whether the request was accepted by the second BS, e.g., the message 304 of FIG. 3. Further, the first BS may transmit additional information to the second BS, which may be accomplished along with the request to handle UL transmissions or in one or more separate messages, e.g., the message 305 of FIG. 3. The additional UE specific information may be used by the second BS in the requested handling of UL transmissions, and include parameters such as UE specific reference signals. The additional information may also include information specific to the first BS, which can be used by the second BS in sending DL transmissions to the UE, e.g., DL reference signals specific to the first BS.

At step 1020, the first BS may receive carrier availability information from the second BS, e.g., via the backhaul link. The carrier availability information indicates one or more available UL carriers controlled by the second BS. In some scenarios, the carrier availability information may also indicate one or more available DL carriers controlled by the second BS. The carrier availability information may be received in a dedicated message or along with other information. For example, the carrier availability information may be received with the message 304 of FIG. 3. In some scenarios, the available UL and/or DL carriers controlled by the second BS may already be known to the first BS, and the carrier availability information does not need to be received from the second BS.

At step 1030, the first BS sends carrier information to the second BS, e.g., via the backhaul link. The carrier information indicates one or more of the UL carriers controlled by the second BS, which are to be used by the second BS for receiving the UL transmissions. In some scenarios, the carrier information may also indicate one or more of the DL carriers controlled by the second BS, which are to be used by the second BS for sending the DL transmissions to the UE. The first base station may select the UL or DL carriers indicated by the carrier information from the available UL or DL carriers indicated by the received carrier availability information of step 1020. The first BS may send the carrier information in a dedicated message or along with other information. For example, the carrier information may be sent with the message 303 of FIG. 3 or with the message 305 of FIG. 3.

At step 1040 the first BS sends DL transmissions to the UE, e.g., the DL transmission 306 of FIG. 3 or the DL transmission 810 of FIG. 8. The DL transmissions include configuration data which have the purpose of configuring the UE to send UL transmissions on the one or more UL carriers as indicated by the carrier information. In some scenarios, i.e., if the carrier information of step 1030 also indicates one or more DL carriers, the configuration data may also configure the UE to receive DL transmissions on these DL carriers. For example, the configuration data may define a carrier aggregation constellation to be used by the UE for sending UL transmissions and receiving DL transmissions, e.g., a carrier aggregation constellation as explained in connection with FIGS. 4 and 6.

In some scenarios, the first BS may receive further UL transmissions from the UE, which include control data with respect to the DL transmissions from the first BS to the UE. In particular, the control data received with the further UL transmissions may include messages for acknowledging receipt of a DL transmission by the first BS or measurement reports generated by the UE. For example, such control data could be received with UL transmission 802 of FIG. 8. In some scenarios, the first BS may also receive control data from the second BS, e.g., forwarded measurement reports from the UE or messages for acknowledging receipt of a DL transmission by the first BS. Such control data can be received from the second BS via the backhaul link, such as in message 806 of FIG. 8.

Figure 11:
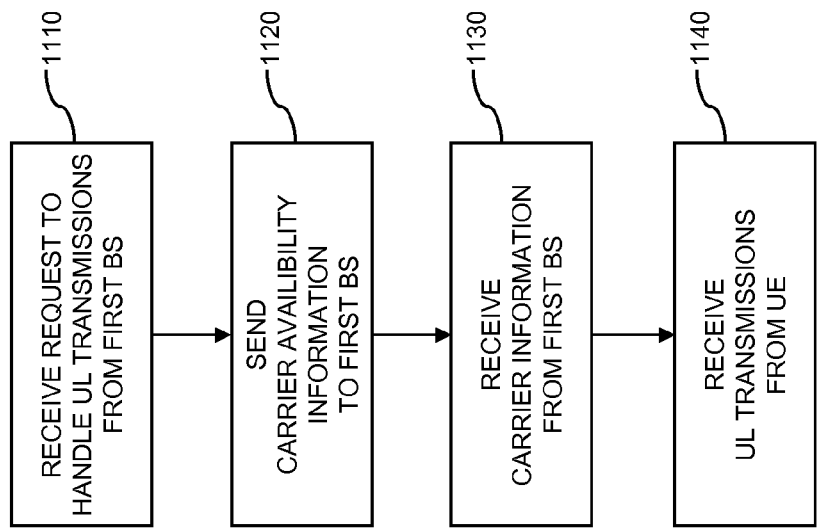
FIG. 11 shows a flowchart for illustrating a further method according an embodiment of the invention.

FIG. 11 shows a flowchart for schematically illustrating a method according to a further embodiment of the invention. The method may be used in the second BS 120 of FIGS. 1, 3, 5, 7, and 8 for implementing the above-described processes using independent DL and UL connections.

At step 1110, a request from a first BS is received by a second BS. By means of the request, the second BS is requested to handle UL transmissions from a UE. The first BS may be the serving BS of the UE, i.e., may control communications with respect to the UE. The first BS may be the first BS 110 of FIGS. 1, 3, 5, 7, and 8, the second BS may be the second BS 120 of FIGS. 1, 3, 5, 7, and 8, and the UE may be the UE 100 of FIGS. 1, 3, 5, 7, and 8. The request to handle UL communications from the UE may be sent via a backhaul link, e.g., the backhaul link 50 of FIGS. 1, 5, and 7. The backhaul link may be established across respective backhaul interfaces of the first and second BSs, such as the backhaul interface 140 of FIG. 9. The requested handling of UL transmissions may include scheduling of the UL transmissions so as to obtain UL scheduling information, such as a time/frequency resource allocation and/or Tx power adjustment used for the UL transmissions. In addition, the requested handling of the UL transmissions includes reception and typically also decoding of the UL transmissions.

Optionally, the second BS may send a message indicating whether the request was accepted, e.g., the message 304 of FIG. 3. Further, the second BS may receive additional information from the first BS, which may be accomplished along with the request to handle UL transmissions or in one or more separate messages, e.g., the message 305 of FIG. 3. The additional information may be used by the second BS in the requested handling of UL transmissions, and include parameters such as UE specific reference signals. The additional information may also include information specific to the first BS, which can be used by the second BS in sending DL transmissions to the UE, e.g., DL reference signals specific to the first BS.

At step 1120, the second BS may send carrier availability information to the first BS, e.g., via the backhaul link. The carrier availability information indicates one or more available UL carriers controlled by the second BS. In some scenarios, the carrier availability information may also indicate one or more available DL carriers controlled by the second BS. The carrier availability information may be sent in a dedicated message or along with other information. For example, the carrier availability information may be sent with the message 304 of FIG. 3. In some scenarios, the available UL and/or DL carriers controlled by the second BS may already be known to the first BS, and the carrier availability information does not need to be sent to the first BS.

At step 1130, the second BS receives carrier information from the first BS, e.g., via the backhaul link. The carrier information indicates one or more of the UL carriers controlled by the second BS, which are to be used by the second BS for receiving the UL transmissions. In some scenarios, the carrier information may also indicate one or more of the DL carriers controlled by the second BS, which are to be used by the second BS for sending the DL transmissions to the UE. The carrier information may be received in a dedicated message or along with other information. For example, the carrier information may be received with the message 303 of FIG. 3 or with the message 305 of FIG. 3.

At step 1140, the second BS receives the UL transmissions from the UE. Typically, this also includes decoding and integrity verification of the received UL transmissions. On the basis of the received UL transmissions, the second BS may generate messages for acknowledging receipt of the UL transmissions. The second BS can send these messages for acknowledging receipt of the UL transmissions in a DL transmission of control data to the UE. Further, the second BS may perform scheduling of the UL transmissions from the UE so as to obtain the UL scheduling information. The second BS can send the UL scheduling information in further DL transmissions of control data to the UE, such as in the DL transmission 809 of FIG. 8. Further, the second BS may also extract control data from the received UL transmissions, e.g., measurement reports from the UE or messages for acknowledging receipt of a DL transmission from the first BS, which can then be forwarded to the first BS, e.g., via the backhaul link, such as in message 806 of FIG. 8.

The methods of FIGS. 10 and 11 may be combined with each other in a communication system including the first BS and the second BS.

As can be seen, by using the above described concepts the overall performance of DL and UL connections in a heterogeneous network can be improved. Further, independent DL and UL connections can be implemented in a manner which is transparent to the UE and without excessive impact on existing technologies.

It is to be understood that the examples and embodiments as explained above are merely illustrative and susceptible to various modifications. For example, the concepts could be used in other types of mobile communication network. For example, the concepts may not only be used in heterogeneous network deployments using Macro and Pico BSs, but also in other network deployments in which imbalances between DL and UL connections may occur. Further, it is to be understood that the above concepts may be implemented by using correspondingly designed software in existing BSs, or by using dedicated hardware in the BSs.

The invention claimed is:

1. A method of communicating data between a first base station, a second base station, and a mobile terminal, the method comprising:
   the first base station sending, to the second base station, a first message comprising a request to handle uplink transmissions from the mobile terminal;
   the first base station receiving, from the second base station, a second message indicating that the second base station accepts the request to handle uplink transmissions from the mobile terminal;
   the first base station sending, to the second base station, a third message comprising carrier information indicating one or more uplink carriers for receiving the uplink transmissions from the mobile terminal, said one or more uplink carriers being controlled by the second base station; and
   the first base station sending downlink transmissions to the mobile terminal, said downlink transmissions configuring the mobile terminal to send uplink transmissions on the one or more uplink carriers as indicated by the carrier information.

2. The method according to claim 1, comprising:
   the first base station receiving, from the second base station, uplink carrier availability information indicating one or more available uplink carriers controlled by the second base station; and
   the first base station selecting said one or more uplink carriers indicated by the carrier information from said one or more available uplink carriers.

3. The method according to claim 1,
   wherein the carrier information further indicates one or more downlink carriers for sending further downlink transmissions, said one or more downlink carriers being controlled by the second base station, and
   wherein the downlink transmissions further include configuration data for configuring the mobile terminal to receive the further downlink transmissions on the one or more downlink carriers as indicated by the carrier information.

4. The method according to claim 3, comprising:
   the first base station receiving, from the second base station, downlink carrier availability information indicating one or more available downlink carriers controlled by the second base station; and
   the first base station selecting said one or more downlink carriers indicated by the carrier information from said one or more available downlink carriers.

5. The method according to claim 1, comprising:
   the first base station selecting the second base station from a plurality of base stations.

6. The method according to claim 5, wherein the first base station selects the second base station on the basis of a parameter which is indicative of a path loss for the uplink transmissions from the mobile terminal to the second base station.

7. The method according to claim 5, wherein the first base station selects the second base station on the basis of a parameter which is indicative of a difference between the path loss for the uplink transmissions from the mobile terminal to the second base station and the path loss for uplink transmissions from the mobile terminal to the first base station.

8. The method according to claim 5, wherein the first base station selects the second base station on the basis of a parameter which is indicative of a difference between a transmit power of the first base station and a transmit power of the second base station.

9. The method according to claim 1 comprising:
   the first base station receiving further uplink transmissions from the mobile terminal, said further uplink transmissions including control data with respect to the downlink transmissions from the first base station.

10. The method according to claim 1, comprising:
    the first base station receiving, from the second base station, control data with respect to the downlink transmissions from the first base station.

11. The method according to claim 1, comprising:
    the second base station receiving the uplink transmissions on the one or more uplink carriers as indicated by the carrier information received from the first base station.

12. A method of assisting in communicating data between a first base station, a second base station., and a mobile terminal, the method comprising:
    the second base station receiving, from the first base station, a first message comprising a request to handle uplink transmissions from the mobile terminal;
    the second base station determining whether to accept the request to handle uplink transmissions from the mobile terminal;
    the second base station sending, to the first base station, a second message indicating that the second base station accepts the request to handle uplink transmissions based on the determination;
    the second base station receiving, from the first base station, a third message comprising carrier information indicating one or more uplink carriers for receiving the uplink transmissions from the mobile terminal, said one or more uplink carriers being controlled by the second base station; and
    the second base station receiving the uplink transmissions from the mobile terminal on the one or more uplink carriers as indicated by the carrier information.

13. The method according to claim 11,
    wherein the carrier information further indicates one or more downlink carriers for sending further downlink transmissions to the mobile terminal, said one or more downlink carriers being controlled by the second base station, and wherein the second base station sends further downlink transmissions to the mobile terminal on the one or more downlink carriers as indicated by the carrier information received from the first base station.

14. The method according to claim 11, comprising:
the second base station sending, to the first base station, carrier availability information indicating one or more of available uplink carriers and available downlink carriers controlled by the second base station.

15. The method according to claim 11, comprising:
the second base station extracting control data from the uplink transmissions received from the mobile terminal; and
the second base station sending the control data to the first base station.

16. The method according to claim 15,
wherein the control data includes measurement reports generated by the mobile terminal.

17. The method according to claim 15, wherein the control data includes one or more messages for acknowledging receipt of a downlink transmission.

18. A base station, comprising:
a radio interface to send downlink transmissions to a mobile terminal and to receive uplink transmissions from the mobile terminal;
a backhaul interface to communicate with a further base station; and
a processor to control operations of the base station,
wherein said operations of the base station comprise:
via the backhaul interface, the base station sending to the further base station a first message comprising a request to handle uplink transmissions from the mobile terminal;
via the backhaul interface, the base station receiving from the further base station a second message indicating that the further base station accepts the request to handle uplink transmissions from the mobile terminal;
via the backhaul interface, the base station sending to the further base station a third message comprising carrier information indicating one or more uplink carriers for receiving the uplink transmissions from the mobile terminal, said one or more uplink carriers being controlled by the further base station; and
via the radio interface, the base station sending downlink transmissions to the mobile terminal, said downlink transmissions configuring the mobile terminal to send the uplink transmissions on the one or more uplink carriers as indicated by the carrier information.

19. A base station comprising:
a radio interface to send downlink transmissions to a mobile terminal and to receive uplink transmissions from the mobile terminal;
a backhaul interface to communicate with a further base station; and
a processor to control operations of the base station,
wherein said operations of the base station comprise:
via the backhaul interface, the base station sending to the further base station a request to handle uplink transmissions from the mobile terminal;
via the backhaul interface, the base station sending to the further base station carrier information indicating one or more uplink carriers for receiving the uplink transmissions, said one or more uplink carriers being controlled by the further base station; and
via the radio interface, the base station sending downlink transmissions to the mobile terminal, said downlink transmissions including configuration data for configuring the mobile terminal to send the uplink transmissions on the one or more uplink carriers as indicated by the carrier information,
wherein the base station is configured to operate as the first base station of the method of claim 1.

20. A base station, comprising:
a radio interface to send downlink transmissions to a mobile terminal and receive uplink transmissions from the mobile terminal;
a backhaul interface to communicate with a further base station; and
a processor to control operations of the base station,
wherein said operations of the base station comprise:
via the backhaul interface, the base station receiving from the further base station a first message comprising a request to handle uplink transmissions from the mobile terminal;
via the processor, the base station determining whether to accept the request to handle uplink transmissions from the mobile terminal;
via the backhaul interface, the base station sending to the further base station a second message indicating that the second base station accepts the request to handle uplink transmissions based on the determination;
via the backhaul interface, the base station receiving from the further base station a third message comprising carrier information indicating one or more uplink carriers for receiving the uplink transmissions from the mobile terminal, said one or more uplink carriers being controlled by the base station; and
via the radio interface, the base station receiving the uplink transmissions from the mobile terminal on the one or more uplink carriers as indicated by the carrier information.

21. A base station comprising:
a radio interface to send downlink transmissions to a mobile terminal and receive uplink transmissions from the mobile terminal;
a backhaul interface to communicate with a further base station; and
a processor to control operations of the base station,
wherein said operations of the base station comprise:
via the backhaul interface, the base station receiving from the further base station a request to handle uplink transmissions from the mobile terminal;
via the backhaul interface, the base station receiving from the further base station carrier information indicating one or more uplink carriers for receiving the uplink transmissions, said one or more uplink carriers being controlled by the base station; and
via the radio interface, the base station receiving the uplink transmissions from the mobile terminal on the one or more uplink carriers as indicated by the carrier information
wherein the base station is configured to operate as the second base station of the method as defined of claim 1.

22. A communication system comprising a first base station and a second base station; wherein the communication system is configured to perform operations comprising:
the first base station sending, to the second base station, a first message comprising a request to handle uplink transmissions from the mobile terminal;
the second base station receiving the request to handle uplink transmissions;

the first base station receiving, from the second base station, a second message indicating that the second base station accepts the request to handle uplink transmission from the mobile terminal;

the first base station sending, to the second base station, a third message comprising carrier information indicating one or more uplink carriers for receiving the uplink transmissions from the mobile terminal, said one or more uplink carriers being controlled by the second base station;

the second base station receiving the carrier information;

the first base station sending downlink transmissions to the mobile terminal, said downlink transmissions configuring the mobile terminal to send the uplink transmissions on the one or more uplink carriers as indicated by the carrier information; and the second base station receiving the uplink transmissions from the mobile terminal on the one or more uplink carriers as indicated by the carrier information.

23. A communication system comprising a first base station and a second base station; wherein the communication system is configured to perform operations comprising:

the first base station sending, to the second base station, a request to handle uplink transmissions from the mobile terminal;

the second base station receiving the request to handle uplink transmissions;

the first base station sending, to the second base station, carrier information indicating one or more uplink carriers for receiving the uplink transmissions, said one or more uplink carriers being controlled by the second base station;

the second base station receiving the carrier information;

the first base station sending downlink transmissions to the mobile terminal, said downlink transmissions including configuration data for configuring the mobile terminal to send the uplink transmissions on the one or more uplink carriers as indicated by the carrier information; and the second base station receiving the uplink transmissions from the mobile terminal on the one or more uplink carriers as indicated by the carrier information, wherein the communication system is configured to operate in accordance with the method of claim 1.

* * * * *